(12) United States Patent
Hakura et al.

(10) Patent No.: US 10,068,366 B2
(45) Date of Patent: Sep. 4, 2018

(54) STEREO MULTI-PROJECTION IMPLEMENTED USING A GRAPHICS PROCESSING PIPELINE

(71) Applicant: NVIDIA Corporation, Santa Clara, CA (US)

(72) Inventors: Ziyad Sami Hakura, San Jose, CA (US); Eric B. Lum, San Jose, CA (US); Henry Packard Moreton, Woodside, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 63 days.

(21) Appl. No.: 15/147,868

(22) Filed: May 5, 2016

(65) Prior Publication Data
US 2017/0323469 A1    Nov. 9, 2017

(51) Int. Cl.
*G06T 1/20* (2006.01)
*G06T 15/00* (2011.01)
*H04N 13/00* (2018.01)

(52) U.S. Cl.
CPC .............. *G06T 15/005* (2013.01); *G06T 1/20* (2013.01); *H04N 13/00* (2013.01)

(58) Field of Classification Search
None
See application file for complete search history.

(56) References Cited

U.S. PATENT DOCUMENTS

| | | | | |
|---|---|---|---|---|
| 8,004,515 B1* | 8/2011 | Cook | ............ | G03B 35/00 345/419 |
| 2008/0049040 A1* | 2/2008 | Aronson | ............ | G06T 17/005 345/587 |
| 2012/0229460 A1* | 9/2012 | Fortin | ............ | G06T 1/20 345/419 |
| 2013/0093767 A1* | 4/2013 | Booth, Jr. | ............ | G06T 15/30 345/419 |
| 2013/0113701 A1* | 5/2013 | Sasaki | ............ | G06T 19/00 345/156 |
| 2014/0267266 A1* | 9/2014 | Crassin | ............ | G06T 15/08 345/424 |

(Continued)

OTHER PUBLICATIONS

Parag et al.; Compilers: Principles and Practice; Section 9.3; Publisher: Pearson India; Published May 2, 2012, ISBN-13: 978-81-317-6491-6.*

*Primary Examiner* — Tize Ma
*Assistant Examiner* — Steven Elbinger
(74) *Attorney, Agent, or Firm* — Zilka-Kotab, PC

(57) ABSTRACT

A method, computer readable medium, and system are disclosed for generating multi-view image data. The method includes the steps of processing primitive data of a model to generate processed primitive data that includes multiple position vectors for each vertex in the primitive data, the number of position vectors associated with each vertex being equal to the number of views in at least two views being generated. The method further includes storing the processed primitive data in a buffer. Finally, the processed primitive data may be read from the buffer for each view in the at least two views and transmitted to a raster pipeline to generate image data corresponding to a particular view.

20 Claims, 12 Drawing Sheets

| Field | View 0 | View 1 | IMAP 0 | IMAP 1 |
|---|---|---|---|---|
| Attribute 0 | Enabled | Enabled | 1111 | 1111 |
| Attribute 1 | Enabled | Disabled | 1010 | 0000 |
| Attribute 2 | Enabled | Disabled | 1110 | 0000 |
| Attribute 3 | Enabled | Disabled | 1111 | 0000 |
| Attribute 4 | Disabled | Enabled | 0000 | 1010 |
| Attribute 5 | Disabled | Enabled | 0000 | 1110 |
| Attribute 6 | Disabled | Enabled | 0000 | 1111 |
| Attribute 7 | Enabled | Enabled | 1011 | 1011 |
| ... | | | | |
| Attribute n | Disabled | Disabled | 0000 | 0000 |

(56) References Cited

U.S. PATENT DOCUMENTS

| | | | |
|---|---|---|---|
| 2015/0084949 A1* | 3/2015 | Venkatesh | H04N 13/0275 345/419 |
| 2015/0341616 A1* | 11/2015 | Siegel | H04N 13/026 348/54 |
| 2017/0091989 A1* | 3/2017 | Ramadoss | G06T 1/20 |

* cited by examiner

| Field | View 0 | View 1 | IMAP 0 | IMAP 1 |
|---|---|---|---|---|
| Attribute 0 | Enabled | Enabled | 1111 | 1111 |
| Attribute 1 | Enabled | Disabled | 1010 | 0000 |
| Attribute 2 | Enabled | Disabled | 1110 | 0000 |
| Attribute 3 | Enabled | Disabled | 1111 | 0000 |
| Attribute 4 | Disabled | Enabled | 0000 | 1010 |
| Attribute 5 | Disabled | Enabled | 0000 | 1110 |
| Attribute 6 | Disabled | Enabled | 0000 | 1111 |
| Attribute 7 | Enabled | Enabled | 1011 | 1011 |
| ⋮ | | | | |
| Attribute n | Disabled | Disabled | 0000 | 0000 |

US 10,068,366 B2

STEREO MULTI-PROJECTION IMPLEMENTED USING A GRAPHICS PROCESSING PIPELINE

FIELD OF THE INVENTION

The present invention relates to graphics processing, and more particularly to generating image data for multi-view applications.

BACKGROUND

Virtual reality (VR) applications are becoming more mainstream, moving from specialized hardware architectures to conventional desktops through devices like the Oculus VR headsets. VR headsets utilize different views projected to different eyes of the user to create the illusion of depth. Like conventional computer applications, image data for display on these devices may be generated in real-time through various applications. A graphics processing unit (GPU) or other specialized graphics hardware may be utilized by the application in order to process more complex geometry in order to create more realistic images.

A GPU may implement at least part of a graphics processing pipeline in order to efficiently process three-dimensional graphics data in order to generate pixel data to be displayed on the display device. Traditionally, primitive data (i.e., data for a model to be rendered) is input into the top of the graphics processing pipeline. The primitive data is sequentially processed through a number of stages of the graphics processing pipeline, which eventually converts the primitive data into pixel data that defines a specific image of the model from a particular virtual camera position. Because stereoscopic images like the ones displayed in VR headsets require two different views generated from two different camera positions, two different images must be generated by the graphics processing pipeline. Conventionally, generating two views from different virtual camera positions would require the application to input the primitive data for the model into the graphics processing pipeline twice—once for each view. However, inputting the primitive data into the graphics processing pipeline twice requires approximately twice the time to process the data and generate two views. Generating multi-view image data in this manner is inefficient as many stages of the graphics processing pipeline may be performing the same calculations twice. Thus, there is a need for addressing these issues and/or other issues associated with the prior art.

SUMMARY

A method, computer readable medium, and system are disclosed for generating multi-view image data. The method includes the steps of processing primitive data of a model to generate processed primitive data that includes multiple position vectors for each vertex in the primitive data, the number of position vectors associated with each vertex being equal to the number of views in at least two views being generated. The method further includes storing the processed primitive data in a buffer. Finally, the processed primitive data may be read from the buffer for each view in the at least two views and transmitted to a raster pipeline to generate image data corresponding to a particular view.

DETAILED DESCRIPTION

Figure 1A:
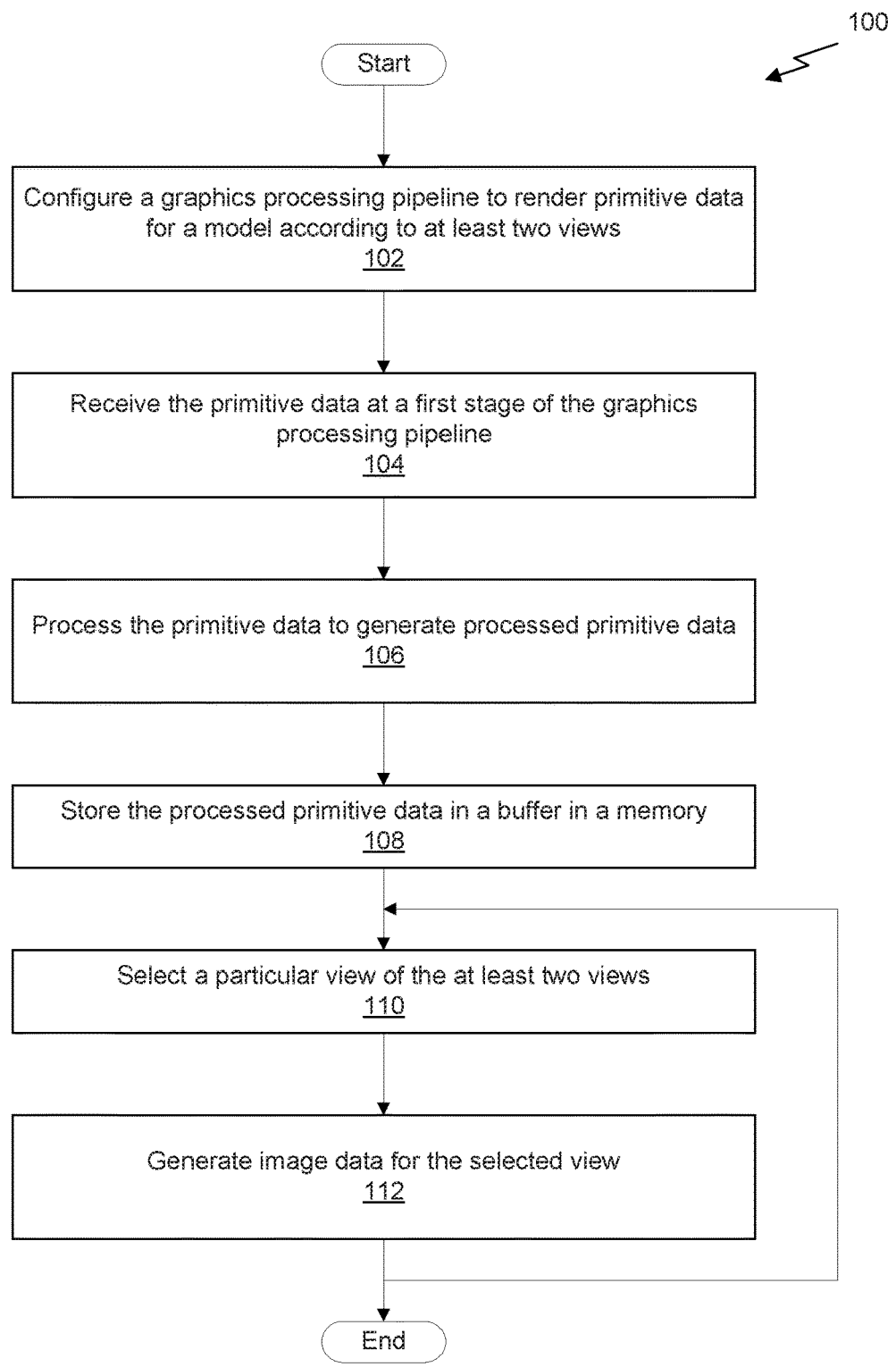
FIG. 1A illustrates a flowchart of a method for generating multi-projection stereo image data, in accordance with one embodiment.

FIG. 1A illustrates a flowchart of a method 100 for generating multi-projection stereo image data, in accordance with one embodiment. It will be appreciated that the method 100 is described within the scope of software executed by a processor, however, in some embodiments, the method 100 may be implemented in hardware or some combination of hardware and software. The method 100 begins at step 102, where a graphics processing pipeline is configured to render primitive data for a model according to at least two views. Each view may be associated with one or more viewports. Each view may correspond with a different virtual camera position utilized to render a model defined by the primitive data. The primitive data may include a number of data structures for geometric primitives (e.g., lines, triangles, quads, triangle fans, triangle strips, patches, etc.). Each geometric primitive may include a number of vertices, each vertex associated with a plurality of vertex attributes. In one embodiment, the graphics processing pipeline is configured to render primitive data for two views, each view being associated with six viewports, each viewport corresponding to a face of a cube map.

At step 104, the graphics processing pipeline receives the primitive data for the model. In one embodiment, an application executed by a host processor utilizes an API that is implemented by a device driver for a parallel processing unit. The device driver translates the API calls to generate a data stream that is transmitted to the parallel processing unit. The data stream may include commands for configuring various hardware units of the parallel processing unit to implement various parts of the graphics processing pipeline as well as primitive data to be processed by the graphics processing pipeline.

At step 106, the graphics processing pipeline processes the primitive data. At least two position vectors are generated for each vertex of the primitive data, each position vector in the at least two position vectors corresponding to a particular view in the at least two views. The primitive data may be processed, and multiple position vectors generated, by any stage in any combination of the vertex shading, tessellation shading, and geometry shading stages implemented by the graphics processing pipeline.

In one embodiment, the geometry shading stage is implemented by a streaming multiprocessor that executes a geometry shader (i.e., a program configured to be executed by a programmable unit of the parallel processing unit) that includes instructions that generate position vectors for each view of the at least two views for each vertex. For example, the geometry shader may generate a position vector that includes an x-coordinate, a y-coordinate, a z-coordinate, and a w-coordinate (e.g., <x, y, z, w>) for a vertex for each view of the at least two views. The different position vectors may be generated based on different virtual camera positions as defined by the application. In a stereoscopic system, the different virtual camera positions are typically configured to match, approximately, the distance between a viewer's eye positions as displaced horizontally symmetrical to a central vertical plane of a viewer's head.

In another embodiment, tessellation may be performed by a hull shading stage, a tessellation stage, and a domain shading stage. In such embodiments, the domain shading stage is implemented by a streaming multiprocessor that executes a domain shader that includes instructions that generate multiple position vectors for each vertex corresponding to each view of the at least two views. In yet another embodiment, a vertex shading stage is implemented by a streaming multiprocessor that executes a vertex shader that includes instructions that generate multiple position vectors for each vertex corresponding to each view of the at least two views.

At step 108, the processed primitive data is stored in a buffer in a memory. The processed primitive data may include a data structure for each vertex that includes multiple position vectors corresponding to each view of the at least two views. A viewport scaling, culling, and clipping (SCC) stage of the graphics processing pipeline may be configured to store the processed primitive data in a buffer using a data output function of the viewport SCC stage such that the geometric primitive data can be transmitted to the raster pipeline (i.e., the stages of the graphics processing pipeline that include rasterization and pixel or fragment shading) multiple times, transmitting the graphics primitives to the raster pipeline once for each view.

At step 110, a particular view of the at least two views is selected. In one embodiment, stereoscopic image data is being generated meaning that there are two views. In such an embodiment, a viewport SCC stage may select either the first view or the second view in order to generate the image data for a left eye image or the image data for a right eye image. At step 112, image data for the selected view is generated utilizing a raster pipeline. The primitive data corresponding to the selected view may be read from the buffer by the viewport SCC stage of the graphics processing pipeline and transmitted to a raster pipeline to generate the image data. The raster pipeline may include a number of stages in the graphics processing pipeline configured to convert the processed primitive data to 2D image data. The stages included in the raster pipeline may include a rasterization stage, a fragment shading stage, and a raster operations stage. Step 110 and 112 may be repeated for each view of the at least two views.

Figure 1B:
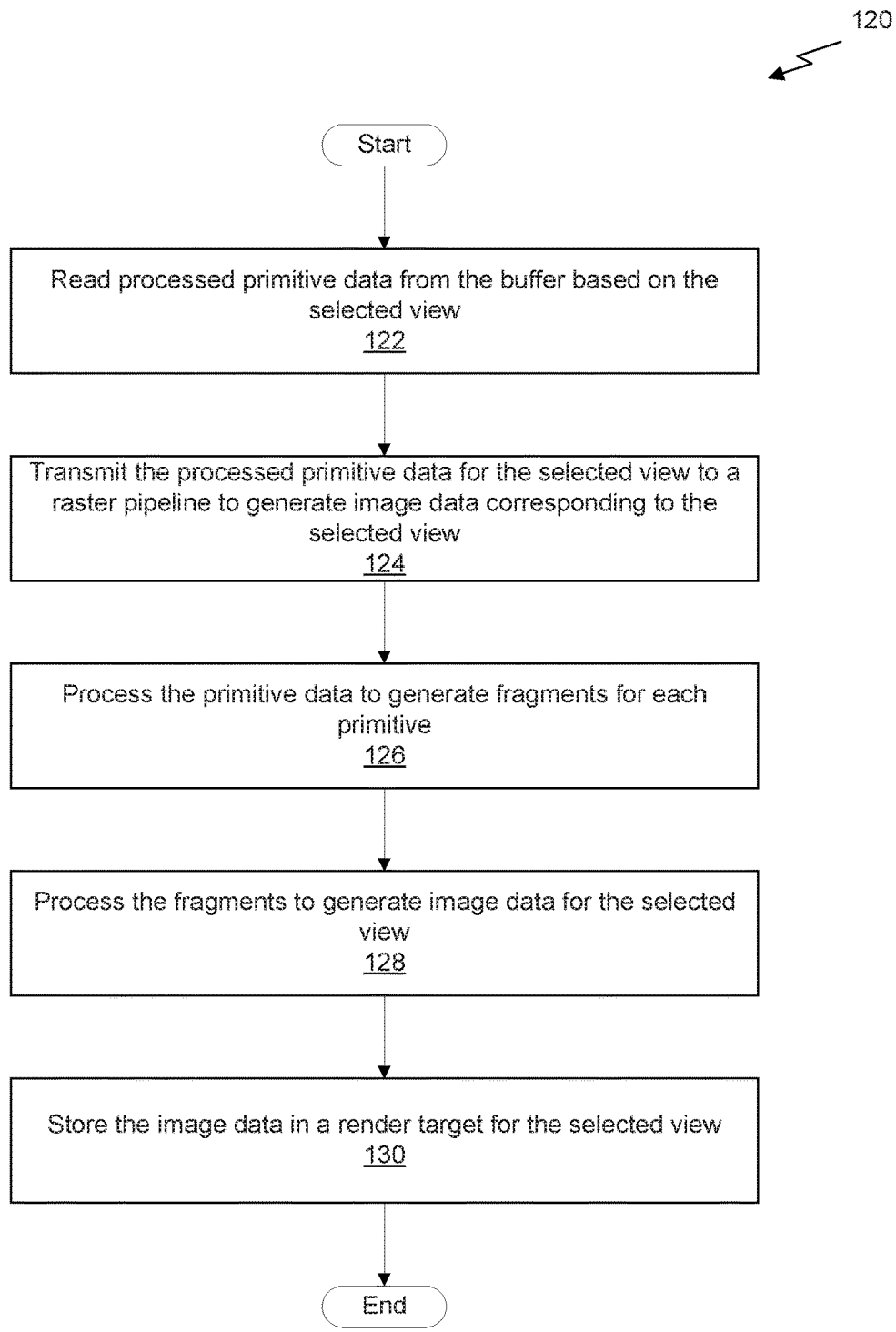
FIG. 1B illustrates a flowchart of a method for generating image data for a selected view, in accordance with one embodiment.

FIG. 1B illustrates a flowchart of a method 120 for generating image data for a selected view, in accordance with one embodiment. Steps 110 and 112 of method 100 may be managed by the viewport SCC stage of the graphics processing pipeline and implemented, at least in part, by the various stages of the raster pipeline. Step 112 may be implemented by the discrete steps illustrated in method 120 of FIG. 1B.

At step 122, primitive data is read from the buffer based on the selected view. In one embodiment, the viewport SCC stage reads the primitive data from the buffer selecting the position vectors for the vertices that correspond to the selected view. In other words, even though the primitive data stored in the buffer includes multiple position vectors for each vertex of the primitive, the viewport SCC stage will read the primitive data as if the primitive data only includes one position vector for each vertex of the primitive, the position vectors that are read corresponding to the selected view being processed. The different position vectors may be stored as vertex attributes in the data structure for the vertex, along with other view-dependent and view-independent attributes. When primitive data is read from the buffer for a particular view, the primitive data will include all view-independent attributes as well as view-dependent attributes corresponding to the particular view, and omitting all view-dependent attributes corresponding to the other views.

At step 124, the primitive data is transmitted to a raster pipeline to generate image data corresponding to the selected view. In one embodiment, the viewport SCC stage transmits the primitive data to a rasterization stage of the graphics processing pipeline, which is a first stage of the raster pipeline. At step 126, the primitive data is processed to generate fragments for each primitive. The rasterization stage of the graphics processing pipeline may convert the primitive data into a plurality of fragments that are transmitted to a fragment shading stage of the graphics processing pipeline. At step 128, fragments are processed to generate image data for the selected view. The fragment shading stage and/or raster operations stage of the raster pipeline may generate final pixel values for image data corresponding to the selected view. At step 130, the image data is stored in a render target for the selected view. A render target may be a frame buffer (i.e., 2D array of image data) allocated in a memory. In one embodiment, each view is associated with a particular render target, with multiple render targets corresponding to multiple views. In another embodiment, image data for two or more views may be stored in a single render target in a side-by-side configuration, with a single render target corresponding to multiple views.

It will be appreciated that the graphics processing pipeline described above processes the primitive data once for all views of the at least two views through a first portion of the pipeline and then processes the primitive data once for each view of the at least two views through a second portion of the pipeline in order to generate image data for each view of the at least two views. Such a configuration enables an application to easily configure the graphics processing pipeline to generate multi-projection views, such as stereoscopic images, using simple configuration commands and then transmit the primitive data used for all views to the graphics processing pipeline only once. In addition, since view-independent processing is only performed once in the first part of the graphics processing pipeline, the technique described above is more efficient than simply feeding the primitive data into the top of the graphics processing pipeline multiple times to generate image data for the different views.

It will also be appreciated that, in some embodiments, work from different views may be interleaved. In other words, the graphics processing pipeline may not strictly serialize the work from each view, fully rendering a particular view before beginning rendering for another view. For example, in systems that implement tiling, image data for a particular tile may be rendered for each of the multiple views before another tile is processed, rendering image data for the new tile for each of the multiple views.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
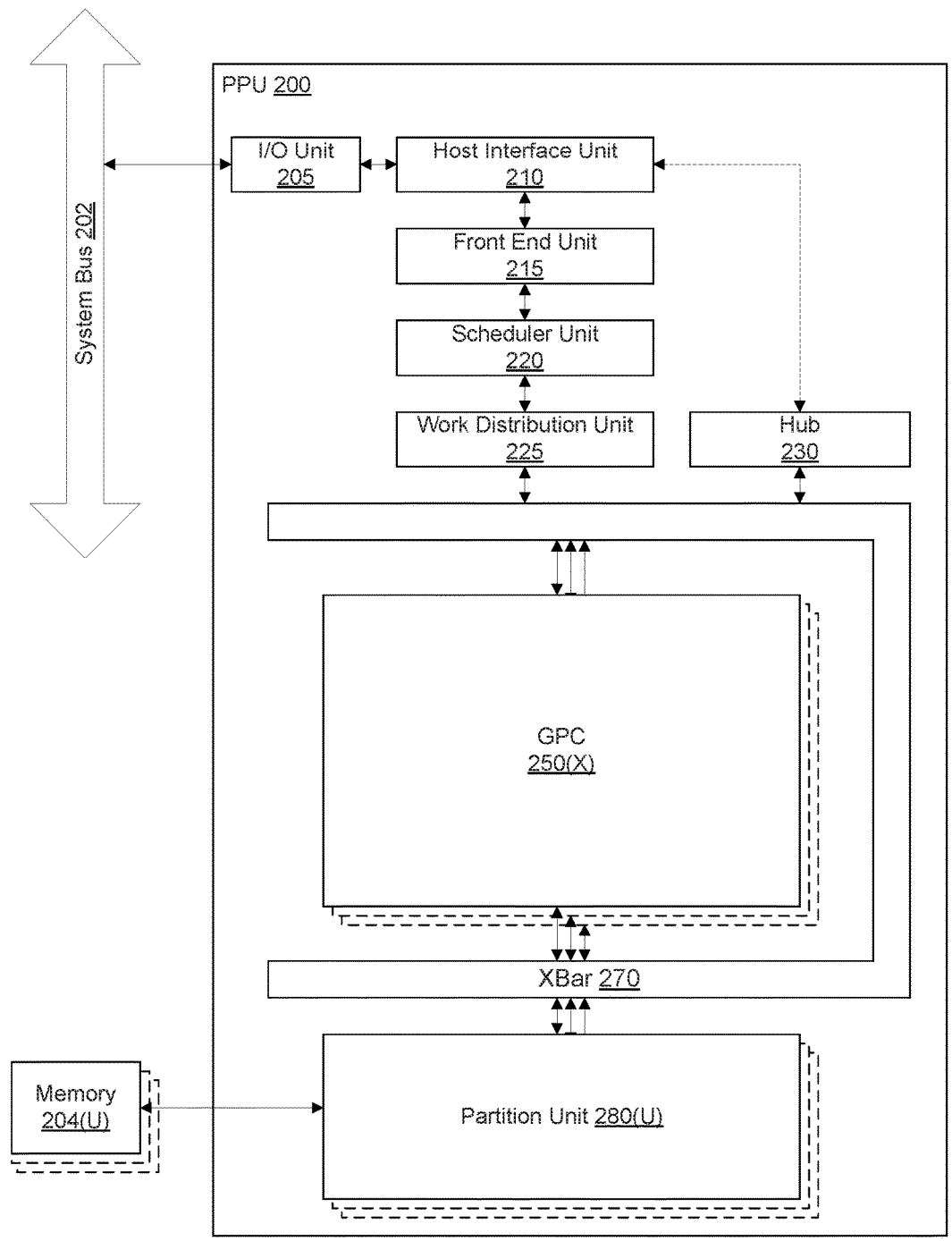
FIG. 2 illustrates a parallel processing unit (PPU), in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225.

The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
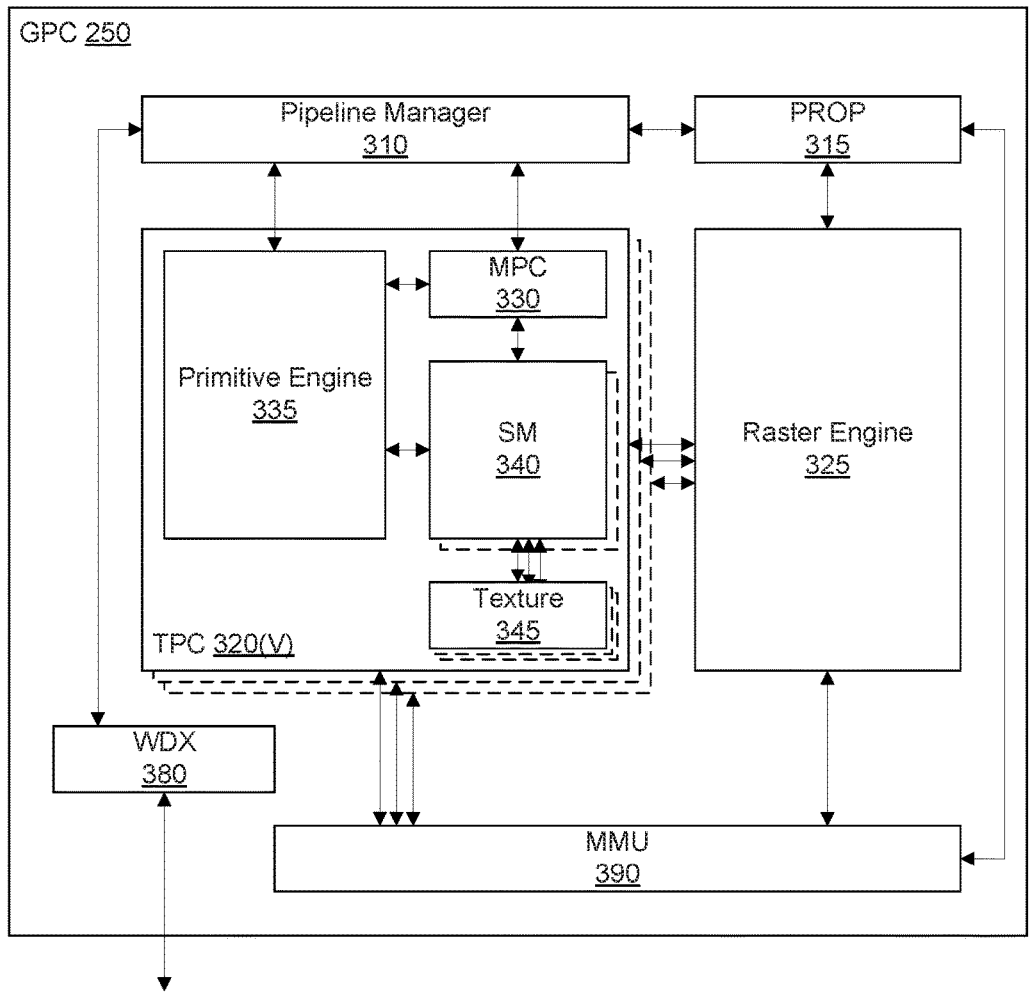
FIG. 3A illustrates a general processing cluster of the PPU of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
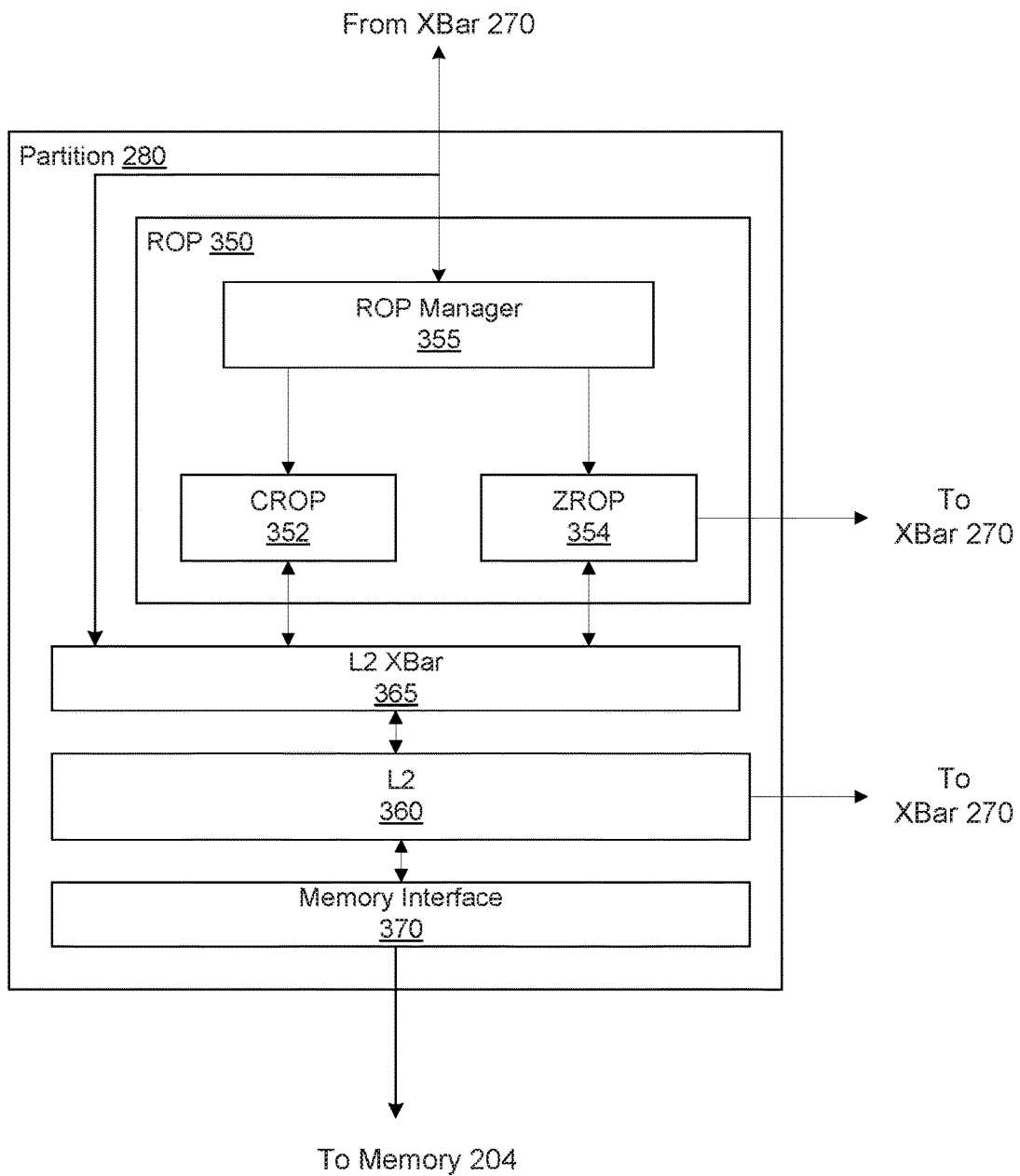
FIG. 3B illustrates a partition unit of the PPU of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
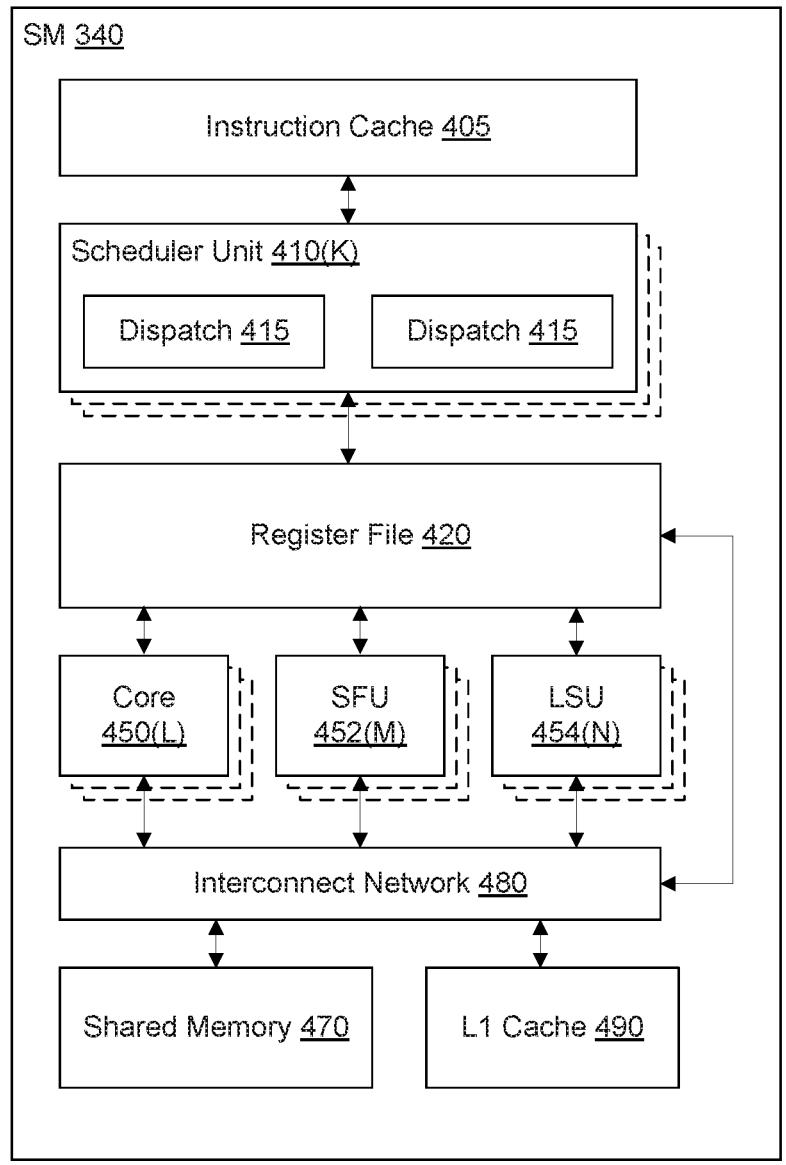
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
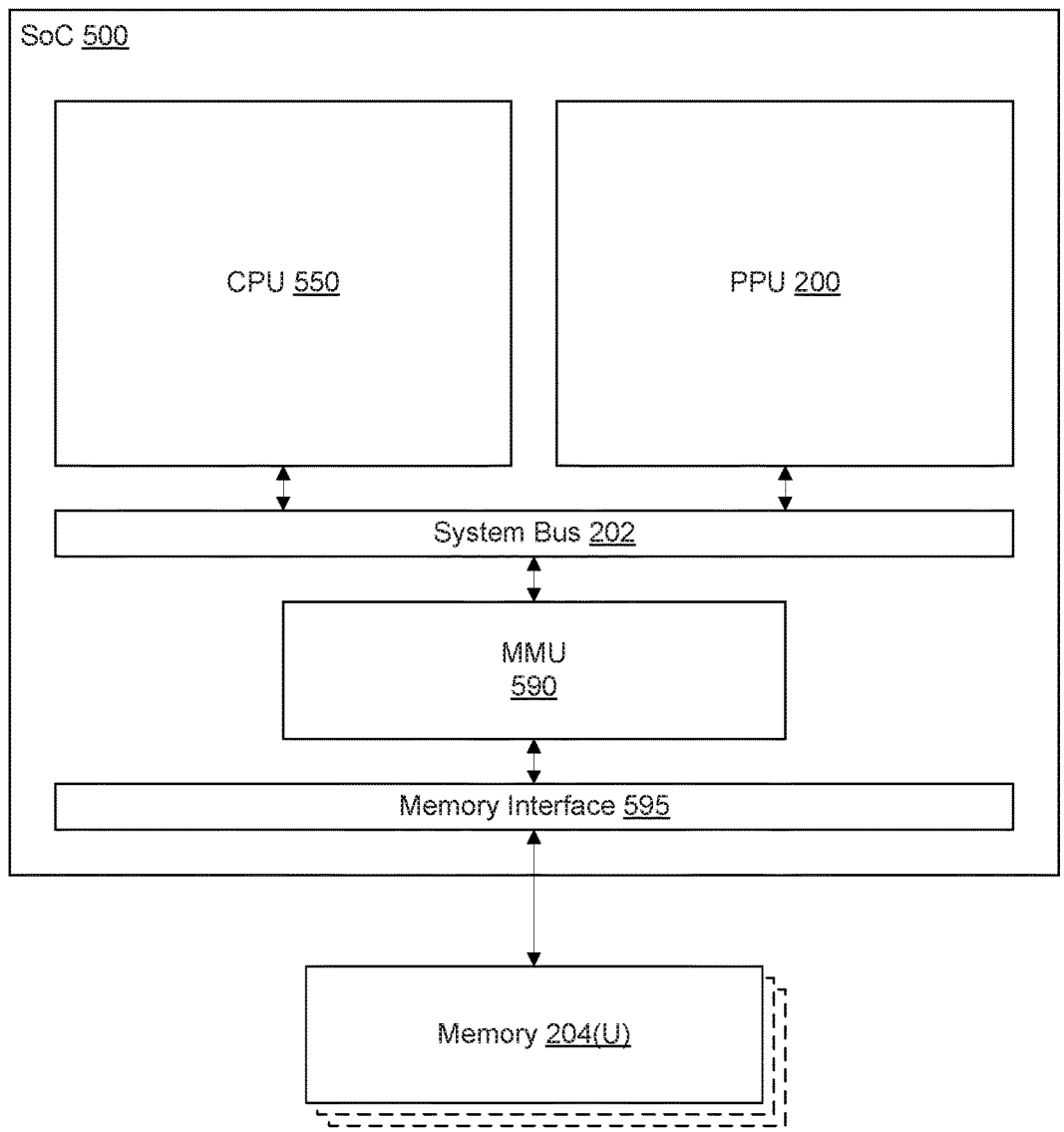
FIG. 5 illustrates a system-on-chip including the PPU of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
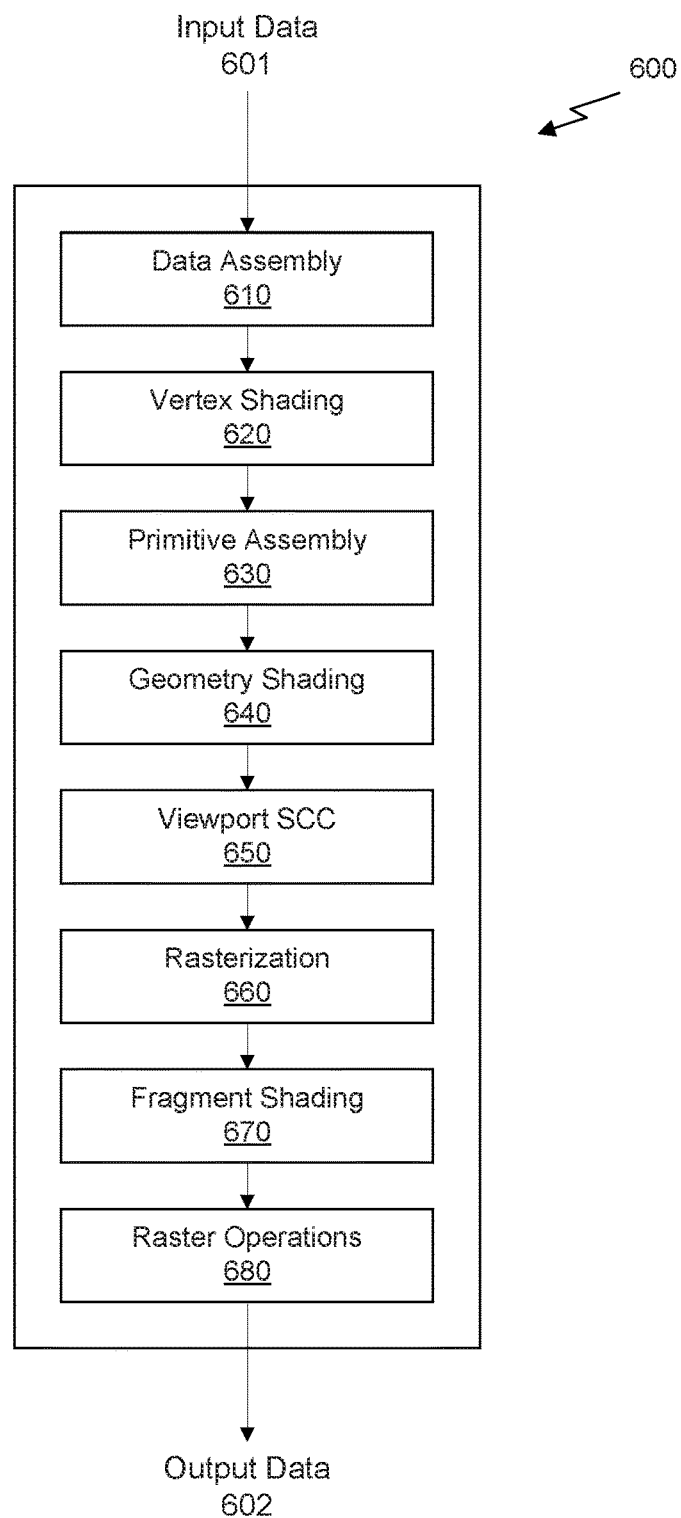
FIG. 6 is a conceptual diagram of a graphics processing pipeline implemented by the PPU of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200.

Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7:
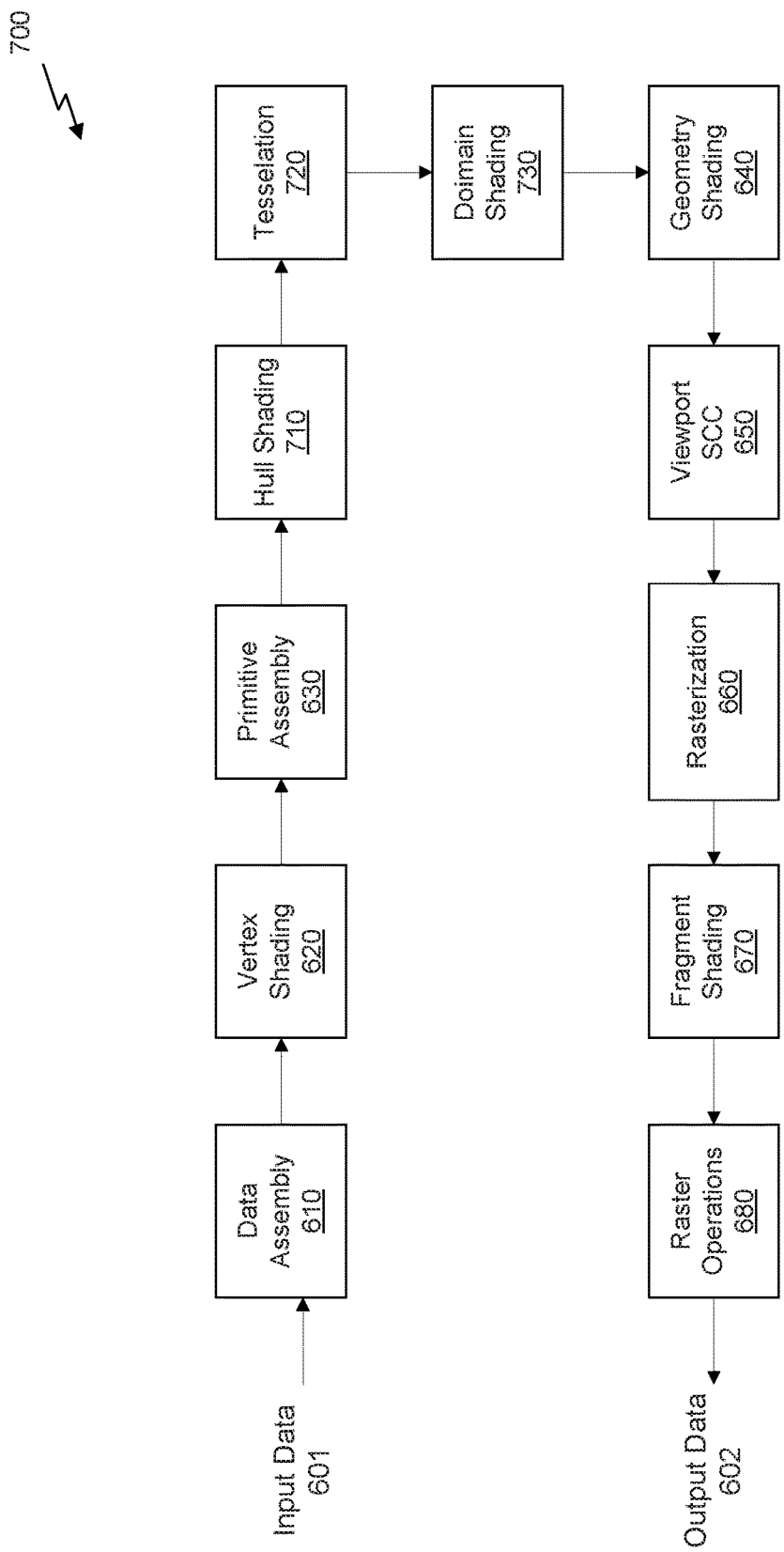
FIG. 7 is a conceptual diagram of a graphics processing pipeline implemented by the PPU of FIG. 2, in accordance with another embodiment.

FIG. 7 is a conceptual diagram of a graphics processing pipeline 700 implemented by the PPU 200 of FIG. 2, in accordance with another embodiment. The graphics processing pipeline 700 is an abstract flow diagram of the processing steps implemented to generate 2D computer-generated images from 3D geometry data. As shown in FIG. 7, the graphics processing pipeline 700 comprises a pipeline architecture that includes a number of stages, many stages of which are similar to the graphics pipeline 600 of FIG. 6. It will be appreciated that the graphics processing pipeline 700 includes a hull shading stage 710, a tessellation stage 720, and a domain shading stage 730 between the primitive assembly stage 630 and the geometry shading stage 640. In the graphics pipeline 600, tessellation of primitives may have been performed in the geometry shading stage 640. By adding separate stages for hull shading, tessellation, and domain shading, tessellation may be performed more efficiently.

The hull shading stage 710 receives primitives from the primitive assembly stage 630 and executes a hull shader. The hull shader is a program that takes a patch of primitives as input and produces a patch of primitives as output along with patch constants utilized by the tessellation stage 720, and/or domain shading stage 730. A patch may include one or more low resolution primitives output by the primitive assembly stage 630. In one embodiment, a patch comprises a single triangle primitive having three vertices.

The tessellation stage 720 of the graphics processing pipeline receives patches from the hull shading stage 710 and tessellates each patch. The tessellation stage 720 may be implemented by a hardware unit that generates new patch having a larger number of control points. For example, the tessellation stage 720 will receive a patch having three vertices, and split each side of the triangle defined by the patch into a number of segments using, e.g., barycentric coordinates. The tessellation stage 720 is a fixed function unit, although the number of splits of each side of a primitive may be configurable. For example, the hull shading stage 710 may output a tessellation factor to the tessellation stage 720 that determines how many splits should be made on each side of a primitive. The tessellation stage 720 may output primitives to the domain shading stage 730.

In another embodiment, the tessellation stage 720 may be implemented by a programmable unit that executes a tessellation shader. The tessellation shader is a program that takes a patch as input and generates a new patch having more vertices as output. The tessellation shader is similar to the fixed function hardware, described above, except the tessellation shader enables programmable control of tessellation. For example, the tessellation shader may calculate a number of splits for each edge of a primitive based on an algorithm. The number of splits may be determined by the size of the primitive, for example, or calculated based on the number of pixels estimated to be covered by the primitive in a screen space.

In yet another embodiment, the tessellation stage 720 may be implemented by both a hardware unit and a programmable unit, with the hardware unit performing a first pass, coarse tessellation and the programmable unit performing a conditional, fine tessellation on the patches output by the hardware unit. Thus, fine tessellation may be performed when the original coarse tessellation does not result in a sufficiently fine mesh.

The domain shading stage 730 receives patches from the tessellation stage 720 and executes a domain shader. The domain shader is a program that takes a tessellated primitive as input and operates on each vertex in the tessellated primitive. The patches operated on by the domain shading stage 730 may be specified in barycentric coordinates and the domain shader may use constants associated with an associated patch in order to translate the barycentric coordinates to actual coordinates for a particular view (i.e., <x, y, z, w>). The output vertices may include position vectors for each view of the two or more views.

The geometry shading stage 640 is similar to the geometry shading stage 640 of FIG. 6. While the geometry shading stage 640 of FIG. 6 performs tessellation as well as any other processing included within the geometry shader, the geometry shading stage 640 of FIG. 7 will not perform tessellation and will only perform additional geometry shading operations because tessellation will have already been performed by the hull shading stage 710, tessellation stage 720, and the domain shading stage 730. It will be appreciated that the other stages of the graphics processing pipeline 700 operate as described above in the graphics processing pipeline 600 of FIG. 6. The graphics processing pipeline 700 simply enables more control of tessellation. In some embodiments, the geometry shading stage 640 may be omitted entirely as the hull shading stage 710, tessellation stage 720, and the domain shading stage 740 perform tessellation and no further geometry shading operations are required.

Figure 8:
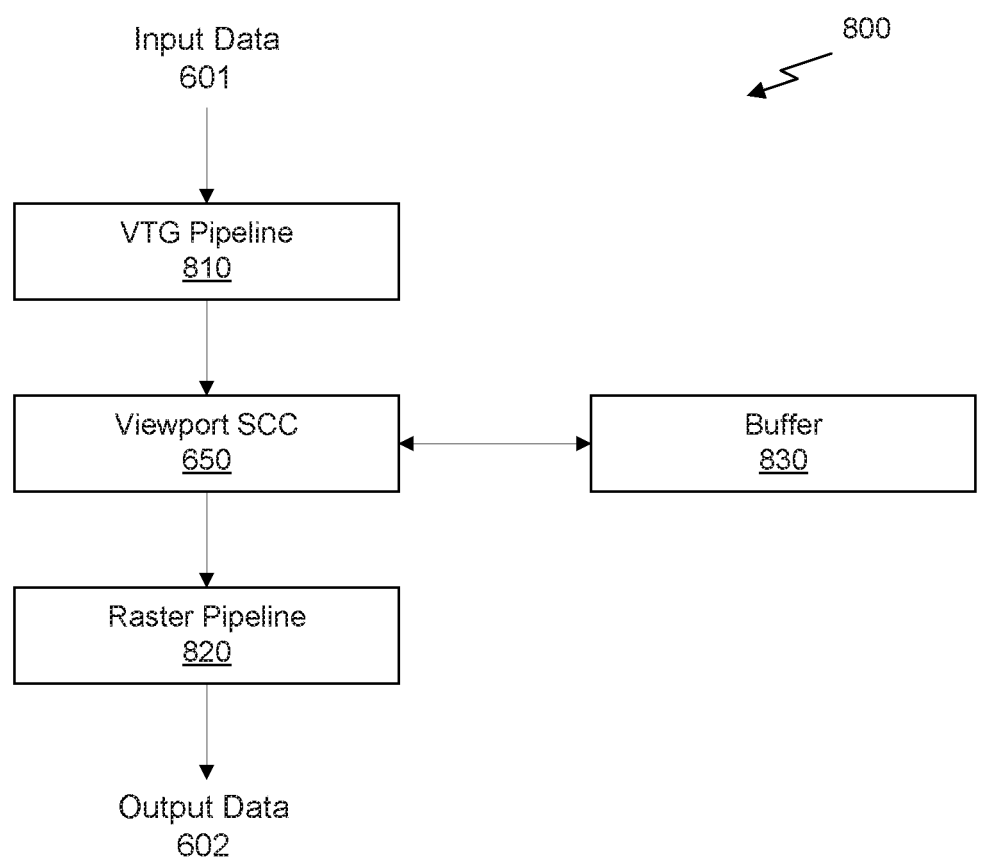
FIG. 8 is a conceptual diagram of a modified graphics processing pipeline, in accordance with one embodiment.

FIG. 8 is a conceptual diagram of a modified graphics processing pipeline 800, in accordance with one embodiment. As shown, the graphics processing pipeline 800 includes a VTG pipeline 810, the viewport SCC stage 650, and a raster pipeline 820. The VTG pipeline 810 includes the stages of the graphics processing pipelines 600 or 700 associated with vertex shading, tessellation, and geometry shading. For example, the VTG pipeline 810 may include the data assembly stage 610, the vertex shading stage 620, the primitive assembly stage 630, and the geometry shading stage 640 of graphics processing pipeline 600. Alternately, the VTG pipeline 810 may include the data assembly stage 610, the vertex shading stage 620, the primitive assembly stage 630, the hull shading stage 710, the tessellation stage 720, the domain shading stage 730, and/or the geometry shading stage 640 of graphics processing pipeline 700. Of course, the VTG pipeline 810 may omit one or more of the stages listed above or include other stages not listed here.

The graphics processing pipeline 800 receives the input data 601 for processing. The input data 601 includes graphics primitives. The graphics primitives are processed by the VTG pipeline 810. For example, the graphics primitives may be processed by a vertex shader, and tessellated by a hull shader and domain shader. The last stage of the VTG pipeline 810 may be configured to generate multiple position vectors for each vertex corresponding to each view of two or more views.

For example, in a stereoscopic image processing system having two views, a vertex output by the VTG pipeline 810 may include two position vectors: a first position vector that specifies a first position (e.g., $<x_0, y_0, z_0, w_0>$) of the vertex for a left eye view; and a second position vector that specifies a second position (e.g., $<x_1, y_1, z_1, w_1>$) of the vertex for a right eye view. The different position vectors for each view may be specified as view-dependent attributes for the vertex. In one embodiment, each component of the position vector may be stored as a separate attribute. For example, the x-coordinate for a position vector may be stored as a first attribute, the y-coordinate for a position vector may be stored as a second attribute, and so forth. In such embodiments, different position vectors may be encoded within the data structure for a vertex by specifying a combination of view-dependent coordinate attributes and view-independent coordinate attributes. For example, two different x-coordinates may be specified for two different views (i.e., view-dependent coordinate attributes), whereas a single y-coordinate, z-coordinate, and w-coordinate may be shared by the position vectors for the two different views (i.e., view-independent coordinate attributes). Thus, five attributes may encode two 4-coordinate position vectors rather than specifying eight attributes (or two 4-coordinate vector attributes).

The viewport SCC stage 650 may implement a data output function that enables the vertex data to be streamed to a buffer 830 in a memory such as memory 204. The buffer 830 may hold vertex data for a plurality of primitives. The buffer 830 is filled and then the buffer 830 is read out one or more times to render the primitives in the buffer 830 via the raster pipeline 820.

The raster pipeline 820 includes the stages of the graphics processing pipelines 600 or 700 associated with converting 3D primitives to 2D pixel data. For example, the raster pipeline 820 may include the rasterization stage 660, the fragment shading stage 670, and the raster operations stage 680 of graphics processing pipelines 600 and 700. The viewport SCC stage 650 is configured to read vertex data from the buffer 830 and transmit the vertex data to the raster pipeline 820 in order to generate pixel data for a particular view of the two or more views.

For example, in a stereoscopic system having two views (i.e., a left eye view and a right eye view), the viewport SCC stage 650 may configure the raster pipeline 820 to generate image data for a first render target. The first render target may be a frame buffer (i.e., a memory for storing a 2D array of pixel values) generated to store image data for a left eye view. The image data may consist of pixel values (e.g., RGB, RGBA, CMYK, YUV, etc.) for each pixel of a display device. Once the raster pipeline 820 is configured, the viewport SCC stage 650 may read the vertex data from the buffer 830 for the left eye view and transmit the vertex data to the raster pipeline 820 for processing in order to generate image data stored in the first render target. The viewport SCC stage 650 may then configure the raster pipeline 820 to generate image data for a second render target. The second render target may be a frame buffer generated to store image data for a right eye view. Once the raster pipeline 820 is configured, the viewport SCC stage 650 may read the vertex data from the buffer 830 for the right eye view and transmit the vertex data to the raster pipeline 820 for processing in order to generate image data stored in the second render target.

It will be appreciated that the size of the buffer 830 may be limited. In other words, in one embodiment, the buffer 830 is too small to hold the vertex data generated for the entire model being rendered. Furthermore, it would be inefficient to buffer vertex data for the entire model out to memory before reading the vertex data in for rendering. Thus, the buffer 830 may be sized to only hold a portion of the vertex data being rendered at any one time. Multiple buffers 830 may be used so that the viewport SCC stage 650 may stream out primitives received from the VTG pipeline 810 into one buffer 830 while the viewport SCC stage 650 reads in primitive data from another buffer 830 to transmit to the raster pipeline 820.

In one embodiment, the buffer 830 may be sized to hold vertex data for a single primitive. For example, the buffer 830 may be sized to hold vertex data for three vertices of a triangle primitive. Each primitive received from the VTG pipeline 810 by the viewport SCC stage 650 is stored in a different buffer 830, and then each primitive is rendered by the raster pipeline 820 a number of times corresponding to the number of views. In another embodiment, the buffer 830 may be sized to hold vertex data for a plurality of primitives. For example, the buffer 830 may be capable of storing vertex data for tens or hundreds of primitives. Thus, many primitives may be stored in the buffer before the primitives are rendered by the raster pipeline 820. In yet another embodiment, the size of the buffer 830 is dynamically allocated by a driver and the viewport SCC stage 650 is configured to store vertex data in the buffer 830 until the buffer is full. Once the buffer is full, the viewport SCC stage 650 may then read the vertex data in to be transmitted to the raster pipeline 820 for rendering.

Figures 9, 10:
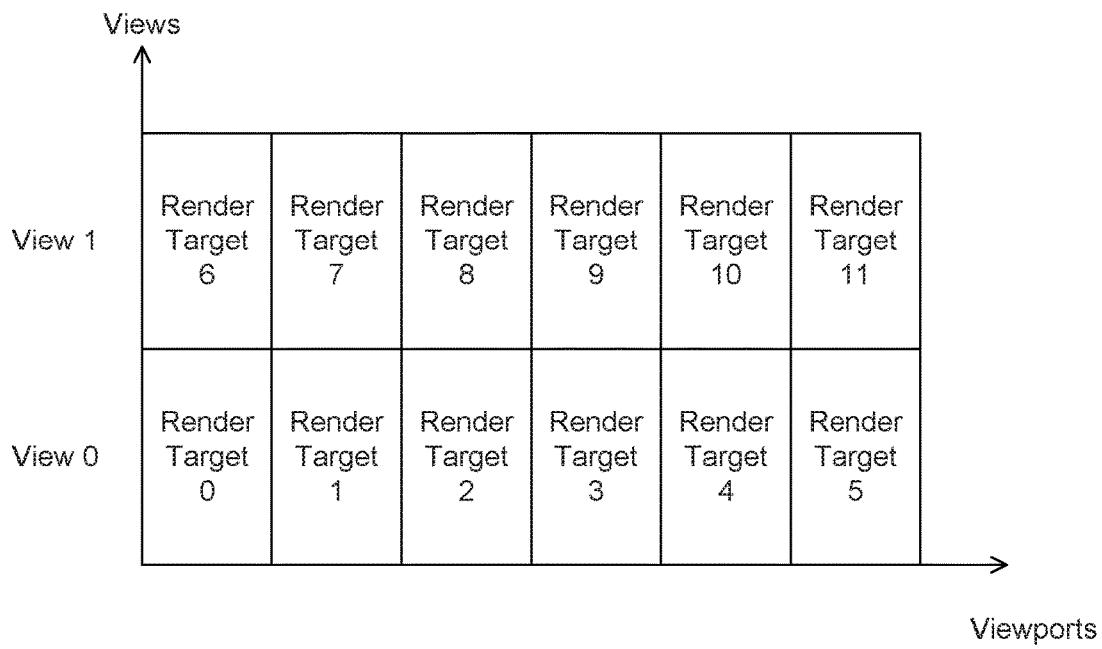
FIG. 9 is a conceptual diagram of a data structure for storing vertex data in the buffer, in accordance with one embodiment.
FIG. 10 illustrates a mapping of views to render targets, in accordance with one embodiment.

FIG. 9 is a conceptual diagram of a data structure for storing vertex data in the buffer 830, in accordance with one embodiment. The vertex data comprises a set of vertex attributes. The attributes may include a position, a color, a normal vector, texture coordinates, or even custom attributes. Each attribute may comprise a vector of between one and four components. Each component may be, e.g., a 32-bit floating point value, a 32-bit integer, a 64-bit floating point value, and the like. Vertex data is stored in the buffer 830 and includes attributes for all views being rendered. In one embodiment, up to 32 generic, 128-bit vertex attribute vectors may be specified for each vertex.

As shown in FIG. 9, a data structure for storing vertex data may include a number of fields. Each field may include a view-independent (common) attribute or a view-dependent attribute. View-independent attributes are enabled for all views. In contrast, view-dependent attributes are only enabled for one view. As shown in FIG. 9, attributes 0 and 7 are common to all views, attributes 1-3 are enabled only for view 0, and attributes 4-6 are enabled only for view 1. The viewport SCC stage 650 is configured to write all of the attributes to the buffer 830 during the data output operation. It will be appreciated that the position vector for each view may be specified in a view-dependent attribute that is enabled for that particular view. For example, a position vector for view 0 may be stored in attribute index 3 and a position vector for view 1 may be stored in attribute index 6. When the viewport SCC stage 650 reads vertex data from the buffer 830 for a particular view, the viewport SCC stage 650 only reads the attributes that are enabled for the particular view. For example, when the viewport SCC stage 650 reads the vertex data for view 0, the viewport SCC stage 650 may read attributes 0-3 and 7. In contrast, when the viewport SCC stage 650 reads the vertex data for view 1, the viewport SCC stage 650 may read attributes 0 and 4-7.

Each attribute is associated with an input map (IMAP) that defines which components of the vector will be utilized by the fragment shading stage 670. A compiler generates the IMAP data for a single view. As shown, the IMAP data is a bit map including four bits for each attribute index that indicates which components of the corresponding attribute vector are utilized by the fragment shading stage 670 of the graphics processing pipeline. In one embodiment, the IMAP data for a first view (e.g., view 0) is generated by the compiler and a last stage of the VTG pipeline 810 generates a corresponding IMAP for each additional view of the two or more views. For example, the domain shading stage 730 may be configured to generate the IMAP 1 data from the IMAP 0 data received from the compiler.

It will be appreciated that view-dependent attributes must be specified sequentially for each view of the two or more views. This requirement enables the viewport SCC stage 650 to read the attributes from the buffer 830 for each view and keep all attributes in the same order. For example, attributes 1, 2, and 3 for view 0 correspond to attributes 4, 5, and 6 for view 1, respectively. In other words, attributes 1 and 4 define different values for the same attribute of the different views, attributes 2 and 5 define different values for the same attribute of the different views, and attributes 3 and 6 define different values for the same attribute of the different views. When the attributes are read from the buffer 830, the first attribute will be attribute 0, the second attribute will be attribute 1 or 4 (depending on the view), the third attribute will be attribute 2 or 5, the fourth attribute will be attribute 3 or 6, and the fifth attribute will be attribute 7. Thus, regardless of which view is being rendered, the order of the attributes will always be the same. This enables the fragment shading stage 670 to process the vertex data received from the rasterization stage 660 the same for all views.

FIG. 10 illustrates a mapping of views to render targets, in accordance with one embodiment. The graphics processing pipeline may enable different render targets (e.g., frame buffers) to be specified when generating image data. A render target is a memory allocated to store a 2D array of image data. Each render target may correspond to an image of a model rendered from a particular viewpoint oriented according to a particular viewport. In one embodiment, up to 4096 different render targets may be specified.

In one embodiment, the graphics processing pipeline may be configured to generate a cube map of the model environment from a particular viewpoint (i.e., a view). A cube map is essentially six images wrapped around the viewpoint in the shape of a cube and represents the rendered image of a model associated with a particular viewpoint having six different viewing frustum orientations. Each portion of the cube map corresponding to one side of the cube may be mapped to a different viewport. The attributes of each viewport may be stored in special registers of the PPU 200 and accessed by the viewport SCC stage 650. A viewport array mask specifies which viewports are enabled. The viewport attributes may define the size and orientation of the viewing frustum used to cull and clip primitives in the viewport SCC stage 650. The viewpoint (i.e., camera position) may be different for each view in order to change the location of the virtual camera position. For example, the viewpoint for a first view may be offset horizontally from a viewpoint of a second view. Rendering images from these offset viewpoints may enable the images to be displayed on a stereoscopic display such that a viewer can perceive a depth of the rendered objects.

When rendering cube maps for stereoscopic views, the graphics processing pipeline may be configured to render six different images for each of the two views. The output of the graphics processing pipeline is stored in a different render target for each view/viewport combination. In one embodiment, the viewport SCC stage 650 is configured to replay the vertex data in the buffer 830 for each active viewport for each of the two views. In other words, the viewport SCC stage 650 may be configured to run through two loops, an inner loop that is run once per viewport enabled via the viewport array mask and an outer loop that is run once per enabled view. During each iteration of the inner loop, the viewport SCC stage 650 reads the viewport data for the active viewport from the registers and reads the vertex data from the buffer 830 for the active view. Various operations may be performed on the vertex data by the viewport SCC stage 650 (such as clipping and culling primitives), and then the vertex data is transmitted to the raster pipeline 820 for rendering to a corresponding render target. During each iteration of the outer loop, the viewport SCC stage 650 changes the view index to the next view and the inner loop is replayed for each of the enabled viewports.

As shown in FIG. 10, each view/viewport combination may be associated with a particular render target stored in the memory. A first view (i.e., view 0) may be associated with a number of different render targets corresponding to the number of enabled viewports. Similarly, a second view (i.e., view 1) may also be associated with the number of different render targets corresponding to the number of enabled viewports. In this case, when rendering a cube map for each view, render targets 0-5 correspond to the different portions of the cube map for the first view and render targets 6-11 correspond to the different portions of the cube map for the second view.

In one embodiment, the PPU 200 may include a hardware unit that offsets a render target array index value based on a view index associated with a particular view. A driver may implement an API that enables a programmer to set a constant that indicates a number of render target array slices configured for each view. The hardware unit may utilize this constant, along with the view index that corresponds with the current view in order to calculate an offset for the render target array index value specified by a shader. For example, the hardware unit may calculate the function:

$$RT\_array\_index = RT\_array\_index + (constant * view\_index) \quad \text{(Eq. 1)}$$

With the cube map example, the constant may be set to 6 such that the render target array index value is increased by six during rendering of view 1 when compared to the corresponding render target array index value for view 0. The viewport SCC stage 650 may be implemented, at least in part, using this hardware unit to adjust the render target array index used during rendering by the calculated offset. In one embodiment, the hardware unit is the raster engine 325.

In another embodiment, the graphics processing pipeline may be configured to generate side-by-side images. For example, a left eye view and a right eye view may be rendered to the same render target. One technique for generating side-by-side images is to render two views of a model using two different viewports, one viewport for each view. Each view may be associated with a different viewport array mask that specifies the viewports enabled for that particular view. The first view may be associated with a first viewport and the second view may be associated with a second viewport that is offset from the first viewport. In other words, the configuration of the second viewport is similar to the first viewport except the second viewport is offset from the first viewport by an image width such that the image data stored to a single render target is stored side-by-side.

It will be appreciated that the PPU 200 may include one or more hardware units that supports per-view viewport array masks. In other words, the hardware unit may utilize multiple registers to store different viewport array masks corresponding to the multiple views. A particular viewport array mask may then be selected from the different registers using the view index of the current view during operations for rendering each view. Thus, a different set of viewports may be enabled for each distinct view of the multiple views. A driver may generate the different viewport array masks for each view and store the viewport array masks in the registers of the PPU 200. In one embodiment, the viewport SCC stage 650 may be implemented, at least in part, using this hardware unit to automatically select the particular viewports to render for each view based on the view index for the view.

Again, the viewport SCC stage 650 may be configured to replay the buffer for each of the view/viewport combinations. Thus, in the case of the cube map and two views, the buffer 830 may be read twelve times to render twelve different images in the twelve different render targets. It will be appreciated that replaying the buffer 830 twelve times and rendering the twelve different images using the raster pipeline 820 is more efficient than processing the entire model through the entire graphics processing pipeline twelve times, since the model data is only processed by the VTG pipeline 810 one time.

Furthermore, benefits of parallelism may be utilized such that multiple raster pipelines 820 may be operated in parallel to generate image data for different viewports simultaneously in order to reduce the number of times vertex data must be read in from the buffer. For example, multiple TPCs 320 may be configured to implement the raster pipelines 820 to render image data for each of the six enabled viewports of each view. Since attribute data is the same for a particular view, data read from the memory into a shared cache such as L2 cache 360 can be quickly accessed by each of the different raster pipelines 820 generating different image data based on the different viewports. The parallel architecture may prevent the VTG pipeline 810 from needing to stall because all buffers 830 available to stream out new vertex data are being utilized.

As used herein, the different stages of the graphics processing pipelines may be implemented within the architecture of the PPU 200. Some stages of the graphics processing pipelines may be implemented on programmable units configured to execute instructions of a program. For example, the vertex shading stage 620, hull shading stage 710, domain shading stage 730, geometry shading stage 640, and fragment shading stage 670 may be implemented by an SM 340 configured to execute instructions of various shader programs. The SMs 340 may execute the shader programs using multiple threads in parallel processing different data. Other stages of the graphics processing pipeline may be implemented on fixed function hardware units, which may be configurable to some extent. For example, the viewport SCC stage 650 and rasterization stage may be implemented by the raster engine 325.

Figure 11:
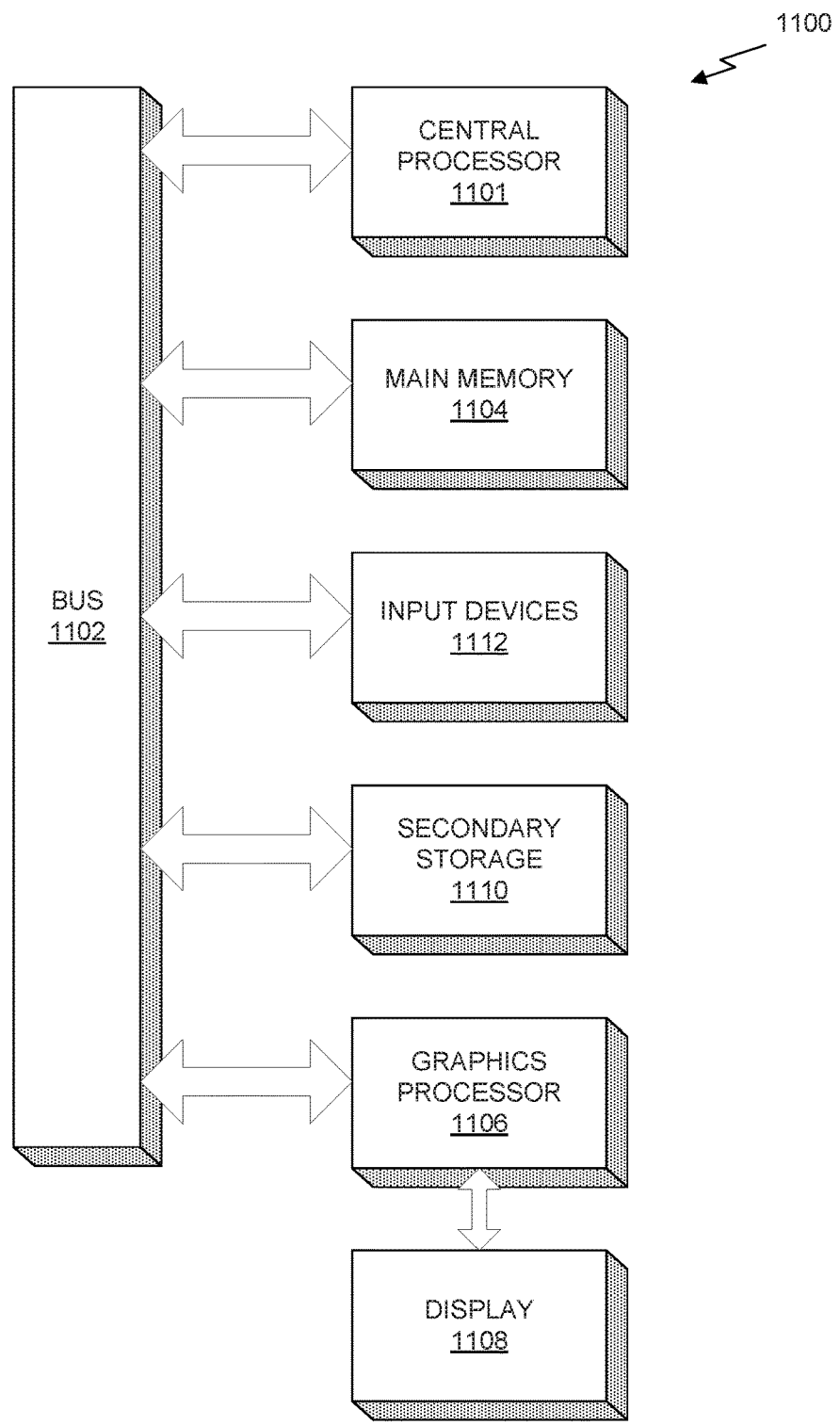
FIG. 11 illustrates an exemplary system in which the various architecture and/or functionality of the various previous embodiments may be implemented.

FIG. 11 illustrates an exemplary system 1100 in which the various architecture and/or functionality of the various previous embodiments may be implemented. As shown, a system 1100 is provided including at least one central processor 1101 that is connected to a communication bus 1102. The communication bus 1102 may be implemented using any suitable protocol, such as PCI (Peripheral Component Interconnect), PCI-Express, AGP (Accelerated Graphics Port), HyperTransport, or any other bus or point-to-point communication protocol(s). The system 1100 also includes a main memory 1104. Control logic (software) and data are stored in the main memory 1104 which may take the form of random access memory (RAM).

The system 1100 also includes input devices 1112, a graphics processor 1106, and a display 1108, i.e. a conventional CRT (cathode ray tube), LCD (liquid crystal display), LED (light emitting diode), plasma display or the like. User input may be received from the input devices 1112, e.g., keyboard, mouse, touchpad, microphone, and the like. In one embodiment, the graphics processor 1106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1100 may also include a secondary storage 1110. The secondary storage 1110 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1104 and/or the secondary storage 1110. Such computer programs, when executed, enable the system 1100 to perform various functions. The memory 1104, the storage 1110, and/or any other storage are possible examples of computer-readable media.

In one embodiment, the architecture and/or functionality of the various previous figures may be implemented in the context of the central processor 1101, the graphics processor 1106, an integrated circuit (not shown) that is capable of at least a portion of the capabilities of both the central processor 1101 and the graphics processor 1106, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1100 may take the form of a desktop computer, laptop computer, server, workstation, game consoles, embedded system, and/or any other type of logic. Still yet, the system 1100 may take the form of various other devices including, but not limited to a personal digital assistant (PDA) device, a mobile phone device, a television, etc.

Further, while not shown, the system 1100 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    configuring a graphics processing pipeline to render primitive data for a model according to at least two views;
    receiving the primitive data for the model at a first portion of the graphics processing pipeline;
    processing, within the first portion of the graphics processing pipeline, the primitive data to generate processed primitive data comprising a plurality of vertices, each vertex in the plurality of vertices comprising a data structure;
    storing the processed primitive data in a buffer in a memory, wherein the data structure for each vertex includes view-independent attributes that are enabled for all views of the at least two views and view-dependent attributes including a first view-dependent attribute that is enabled only for a first view of the at least two views and a second view-dependent attribute that is enabled only for a second view of the at least two views;
    receiving a first input map for the first view indicating a first component of the first view-dependent attribute used by a fragment shading stage within the graphics processing pipeline and a second component of the first view-dependent attribute not used by the fragment shading stage;
    generating, within the graphics processing pipeline, a second input map for the second view indicating the second component of the first view-dependent attribute is used by the fragment shading stage; and
    for each view of the at least two views:
        selecting a particular view of the at least two views,
        reading the processed primitive data from the buffer based on the selected view, and
        generating image data for the selected view within a second portion of the graphics processing pipeline.

2. The method of claim 1, wherein the first portion of the graphics processing pipeline includes a geometry shading stage, and wherein the geometry shading stage is implemented by configuring a streaming multiprocessor of a parallel processing unit to execute, via one or more threads, a geometry shader, the one or more threads configured to generate the view-independent attributes and the view-dependent attributes for each vertex.

3. The method of claim 1, wherein the first portion of the graphics processing pipeline includes a domain shading stage, and wherein the domain shading stage is implemented by configuring a streaming multiprocessor of a parallel processing unit to execute, via one or more threads, a domain shader, the one or more threads configured to generate the view-independent attributes and the view-dependent attributes for each vertex.

4. The method of claim 1, wherein the first portion of the graphics processing pipeline includes a vertex shading stage, and wherein the vertex shading stage is implemented by configuring a streaming multiprocessor of a parallel processing unit to execute, via one or more threads, a vertex shader, the one or more threads configured to generate the view-independent attributes and the view-dependent attributes for each vertex.

5. The method of claim 1, wherein the second portion of the graphics processing pipeline includes at least one of a rasterization stage, the fragment shading stage, and a raster operations stage.

6. The method of claim 1, wherein the graphics processing pipeline includes a viewport scaling, clipping, and culling (SCC) stage configured to store the processed primitive data in the buffer and read the processed primitive data from the buffer based on the selected view.

7. The method of claim 1, wherein a parallel processing unit includes a raster engine that is configured to store the processed primitive data in the buffer, read the processed primitive data from the buffer a number of times corresponding to the number of views in the at least two views, and transmit the processed primitive data to the second portion of the graphics processing pipeline to render the processed primitive data and generate image data for each view in the at least two views.

8. The method of claim 7, wherein six viewports are enabled for each view, and wherein the six viewports are configured to generate a cube map of the model corresponding to each view.

9. The method of claim 7, wherein the raster engine is configured to select a second render target for storing image data to a second view of the at least two views based on a second render target index, wherein the second render target index is calculated by a hardware unit within the graphics processing pipeline as a sum of a first render target array index corresponding to the first render target and a product of a view index corresponding to the second view and a constant.

10. The method of claim 1, wherein the graphics processing pipeline is configured to render primitive data for two views to generate stereoscopic image data.

11. The method of claim 10, wherein image data for a first view of the stereoscopic image data is stored in a first portion of a render target and image data for a second view of the stereoscopic image data is stored in a second portion of the render target, wherein the image data for the first view is rendered according to a first viewport array mask that specifies a first viewport is enabled and the image data for the second view is rendered according to a second viewport array mask that specifies a second viewport is enabled.

12. The method of claim 1, wherein generating image data for the selected view within the second portion of the graphics processing pipeline comprises generating image data corresponding to each enabled viewport specified by a viewport array mask, each view of the at least two views corresponding to a different viewport array mask.

13. The method of claim 1, wherein four of the view-independent attributes, the first view-dependent attribute, and the second view-dependent attribute encode two four-coordinate position vectors.

14. The method of claim 1, wherein the first input map is generated by a compiler.

15. A non-transitory, computer-readable storage medium storing instructions that, when executed by a processor, cause the processor to perform steps comprising:
configuring a graphics processing pipeline to render primitive data for a model according to at least two views;
receiving the primitive data for the model at a first portion of the graphics processing pipeline;
processing, within the first portion of the graphics processing pipeline, the primitive data to generate processed primitive data comprising a plurality of vertices, each vertex in the plurality of vertices comprising a data structure;
storing the processed primitive data in a buffer in a memory, wherein the data structure for each vertex includes view-independent attributes that are enabled for all views of the at least two views and view-dependent attributes including a first view-dependent attribute that is enabled only for a first view of the at least two views and a second view-dependent attribute that is enabled only for a second view of the at least two views;
receiving a first input map for the first view indicating a first component of the first view-dependent attribute used by a fragment shading stage within the graphics processing pipeline and a second component of the first view-dependent attribute not used by the fragment shading stage;
generating, within the graphics processing pipeline, a second input map for the second view indicating the second component of the first view-dependent attribute is used by the fragment shading stage; and
for each view of the at least two views:
selecting a particular view of the at least two views,
reading the processed primitive data from the buffer based on the selected view, and
generating image data for the selected view within a second portion of the graphics processing pipeline.

16. A system, comprising:
a parallel processing unit configured to implement one or more stages of a graphics processing pipeline, the parallel processing unit configured to:
render primitive data for a model according to at least two views,
receive the primitive data for the model at a first portion in the graphics processing pipeline,
process, within the first portion of the graphics processing pipeline, the primitive data to generate processed primitive data comprising a plurality of vertices, each vertex in the plurality of vertices comprising a data structure,
store the processed primitive data in a buffer in a memory, wherein the data structure for each vertex includes view-independent attributes that are enabled for all views of the at least two views and view-dependent attributes including a first view-dependent attribute that is enabled only for a first view of the at least two views and a second view-dependent attribute that is enabled only for a second view of the at least two views,
receive a first input map for the first view indicating a first component of the first view-dependent attribute used by a fragment shading stage within the graphics processing pipeline and a second component of the first view-dependent attribute not used by the fragment shading stage,
generate a second input map for the second view indicating the second component of the first view-dependent attribute is used by the fragment shading stage, and
for each view of the at least two views:
select a particular view of the at least two views,
read the processed primitive data from the buffer based on the selected view, and
generate image data for the selected view within a second portion of the graphics processing pipeline.

17. The system of claim 16, wherein the first portion of the graphics processing pipeline includes at least one of a vertex shading stage, a domain shading stage, and a geometry shading stage; wherein the second portion of the graphics processing pipeline includes at least one of a rasterization stage, the fragment shading stage, and a raster operations stage;
and wherein the graphics processing pipeline further includes a viewport scaling, culling, and clipping (SCC) stage between the first portion of the graphics processing pipeline and the second portion of the graphics processing pipeline.

18. The system of claim 16, wherein the parallel processing unit includes a raster engine that is configured to store the processed primitive data in the buffer, read the processed primitive data from the buffer a number of times corresponding to the number of views in the at least two views, and transmit the processed primitive data to the second portion of the graphics processing pipeline to render the processed primitive data and generate image data for each view in the at least two views.

19. The system of claim 18, wherein six viewports are enabled for each view, and wherein the six viewports are configured to generate a cube map of the model corresponding to each view.

20. The system of claim 16, wherein the graphics processing pipeline is configured to render primitive data for two views to generate stereoscopic image data.

* * * * *